United States Patent [19]
Kojima

[11] Patent Number: 5,624,336
[45] Date of Patent: Apr. 29, 1997

[54] FRONT DERAILLEUR WITH INDEPENDENTLY MOVABLE CHAIN GUIDE PLATES

[75] Inventor: Satoru Kojima, Sakai, Japan

[73] Assignee: Shimano, Inc., Osaka, Japan

[21] Appl. No.: 580,064

[22] Filed: Dec. 20, 1995

[30] Foreign Application Priority Data

Dec. 20, 1994 [JP] Japan .................. 6-316234

[51] Int. Cl.$^6$ ........................................ F16H 9/00
[52] U.S. Cl. ................................................ 474/82
[58] Field of Search ........................ 474/78, 80, 82, 474/116

[56] References Cited

U.S. PATENT DOCUMENTS

| 4,237,743 | 12/1980 | Nagano | 474/82 |
|---|---|---|---|
| 4,279,172 | 7/1981 | Nagano et al. | 474/82 |
| 4,305,712 | 12/1981 | Nagano | 474/82 |
| 4,362,522 | 12/1982 | Huret | 474/82 |
| 4,551,121 | 11/1985 | Nagano | 474/80 X |
| 4,604,078 | 8/1986 | Nagano | 474/80 |

FOREIGN PATENT DOCUMENTS

| 2532608 | 3/1984 | France | B62M 9/12 |
|---|---|---|---|
| 2562025 | 10/1985 | France | B62M 9/12 |
| 2621373 | 4/1989 | France | F16H 11/08 |
| 61-150884 | 7/1986 | Japan | B62M 9/12 |

*Primary Examiner*—Roger J. Schoeppel
*Attorney, Agent, or Firm*—James A. Deland

[57] ABSTRACT

A front derailleur includes a base member for connecting to a bicycle frame, a first link pivotably connected to the base member at a first base member connection location, and a second link pivotably connected to the base member at a second base member connection location. An inner chain guide is pivotably connected to the first link at a first inner chain guide connection location and to the second link at a second inner chain guide connection location so that the inner chain guide moves laterally when the first link and the second link pivot relative to the base member. An outer chain guide is pivotably connected to at least one of the first link or the second link at a first outer chain guide connection location which differs from the corresponding first inner chain guide connection location or second inner chain guide connection location so that the outer chain guide moves laterally when the first link and the second link pivot relative to the base member.

17 Claims, 9 Drawing Sheets

FRONT DERAILLEUR WITH INDEPENDENTLY MOVABLE CHAIN GUIDE PLATES

BACKGROUND OF THE INVENTION

The present invention is directed to bicycle front derailleurs and, more particularly, to a front derailleur with independently movable chain guide plates.

Generally, in cases where a chain is switched among a plurality of front chain wheels by means of a derailleur, it is necessary to cause the chain switching guide to move through a greater lateral stroke in the case of down-shifting, in which the chain is switched from a larger-diameter chain wheel to a smaller-diameter chain wheel by means of the outer chain switching guide of the derailleur, than in the case of up-shifting, in which the chain is switched from a smaller-diameter chain wheel to a larger-diameter chain wheel by means of the inner chain switching guide of the derailleur. Accordingly, in a derailleur in which both the inner and outer guides move as a unit (e.g., in a derailleur in which the outer chain switching guide and the inner chain switching guide are formed as a single part), an up-shifting operation is performed by causing the inner chain switching guide to move through a stroke which is the same as the lateral stroke of the outer chain switching guide in the case of down-shifting. In other words, a shifting operation is performed in this case by causing the inner chain switching guide to complete a stroke which is larger than the stroke actually required for the switching of the chain. Accordingly, in the case of up-shifting, the derailleur is operated while causing a great elastic deformation of the return spring used for down-shifting derailleur operation, so that the shifting operation becomes heavy.

Japanese Patent Application Kokai No. 61-150884 discloses a front derailleur wherein the inner and outer chain switching guides move independently. Specifically, in that derailleur, the inner chain switching guide is connected to the base member via an inner swinging link and an outer swinging link, and a parallel four-member link mechanism is formed by these members. The outer chain switching guide is connected to the outer swinging link, and a motion converting mechanism is coupled to the outer chain switching guide. The motion converting mechanism is constructed so that it converts the movement of a spring which drives the inner chain switching guide toward the low-speed side into a swinging motion of the outer chain switching guide. When an operating arm which is capable of swinging relative to the outer chain switching guide is operated by means of an operating cable, the parallel four-member link mechanism is deformed so that the inner chain switching guide moves in the lateral direction of the bicycle frame. At the same time, as a result of the action of the motion converting mechanism, the outer chain switching guide acts separately from the inner chain switching guide, and moves in the lateral direction of the bicycle frame.

In this derailleur, it is necessary to install the pivoting part, and to install the operating arm separately from the swinging links, etc. Accordingly, the derailleur has a relatively complicated structure.

SUMMARY OF THE INVENTION

The present invention is directed to a front derailleur with independently movable chain guide plates having a much simpler structure than known front derailleurs with similar capabilities. In one embodiment of the present invention, the front derailleur comprises a base member for connecting to a bicycle frame, a first link pivotably connected to the base member at a first base member connection location, and a second link pivotably connected to the base member at a second base member connection location. An inner chain guide is pivotably connected to the first link at a first inner chain guide connection location and to the second link at a second inner chain guide connection location so that the inner chain guide moves laterally when the first link and the second link pivot relative to the base member. An outer chain guide is pivotably connected to at least one of the first link or the second link at a first outer chain guide connection location which differs from the corresponding first inner chain guide connection location or second inner chain guide connection location so that the outer chain guide moves laterally when the first link and the second link pivot relative to the base member. In a more specific embodiment, a distance between the first outer chain guide connection location and the corresponding first base member connection location or second base member connection location is greater than a distance between the corresponding first inner chain guide connection location or second inner chain guide connection location and the first base member connection location or second base member connection location. Alternatively, the distance could be less.

In a more specific embodiment, the inner chain guide may include a first inner chain pushing part which is positioned at a lower end of the inner chain guide, a second inner chain pushing part which is positioned at a higher level than the first inner chain pushing part and which projects toward the outer chain guide, and a third inner chain pushing part which is positioned at a higher level than the second inner chain pushing part and which projects further toward the outer chain guide than the second inner chain pushing part. Similarly, the outer chain guide may include a first outer chain pushing part which is positioned at a front end of the outer chain guide and a second outer chain pushing part which is positioned at a lower level than the first inner chain pushing part and which projects toward the inner chain guide. These chain pushing parts help the chain shifting operation by guiding the chain in an appropriate manner. In the disclosed embodiment, chain shifting is optimized when a distance between the first outer chain pushing part and the third inner chain pushing part when the first link and the second link are located at a first position is greater than a distance between the first outer chain pushing part and the third inner chain pushing part when the first link and the second link are located at a second position that is laterally inward of the first position. Similarly, a distance between the second outer chain pushing part and the second inner chain pushing part when the first link and the second link are located at the first position is greater than a distance between the second outer chain pushing part and the second inner chain pushing part when the first link and the second link are located at the second position.

DETAILED DESCRIPTION OF THE EMBODIMENTS

As is shown in FIGS. 1–5, an inner chain switching guide 4 and an outer chain switching guide 5 are connected to a base member 1 via a pair of swinging links 2, 3. One of the pair of swinging links 2, 3, I. e., the swinging link 2, is driven toward the base member by a coil type return spring 6 which is installed inside the base end portion of the swinging link 2 so that one end of spring 6 is anchored to the base member 1, while the other end of spring 6 is anchored to the swinging link 2. As a result, the system is constructed so that the inner and outer chain switching guides 4 and 5 are driven toward their low-speed positions.

In this front derailleur, the base member 1 is connected to the bicycle frame, and an operating cable 8 from a shifter operating device (not shown in the figures) is connected to an operating arm 7 which is formed as an integral part of the swinging link 2. The derailleur is operated by pulling or slackening the operating cable 8 so that a bicycle driving chain 9 is switched among three front chain wheels H1, H2 and H3 which have large, medium and small outer diameters, respectively.

Figure 5:
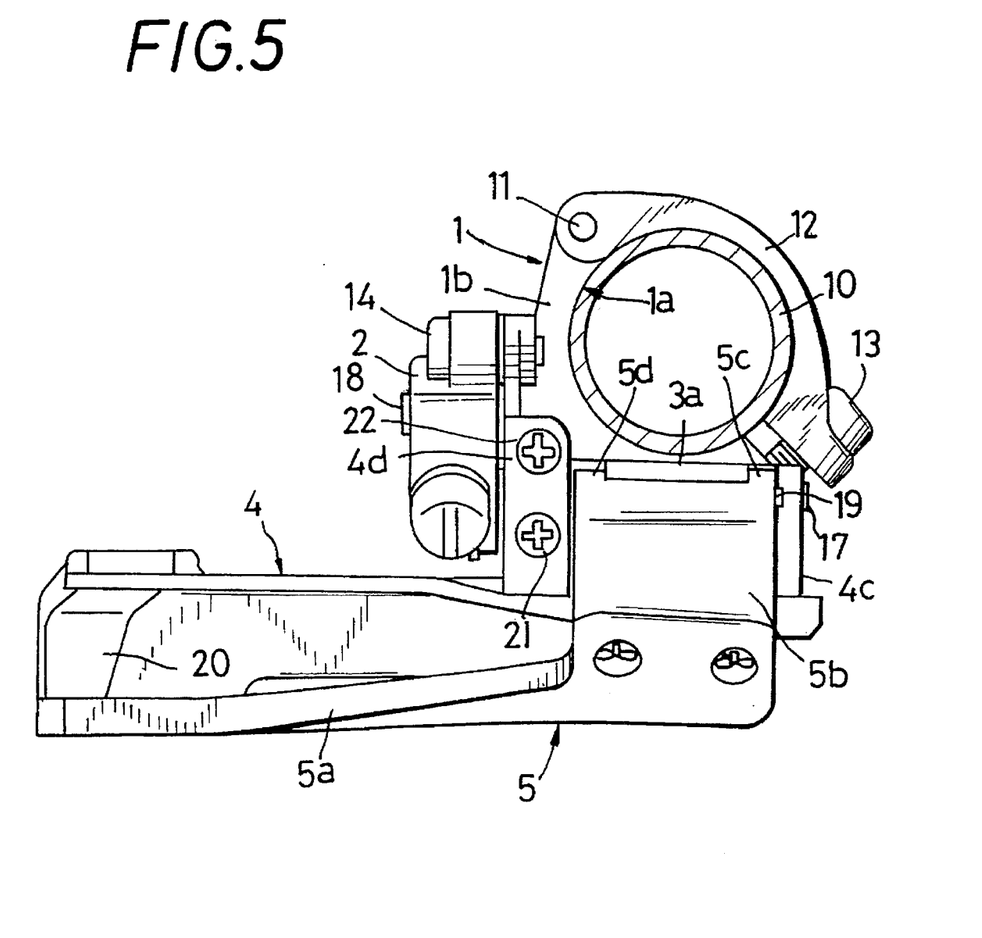
FIG. 5 is a top view of the bicycle derailleur shown in FIG. 1.

As shown in FIG. 5, the base member 1 is equipped with an attachment part 1b which has a curved attachment surface 1a formed so that attachment surface 1a conforms to the outer circumferential surface of the seat tube part 10 of the bicycle frame, and a tightening band 12 which is attached to the attachment part 1b by means of a pin 11 so that tightening band 12 can freely be opened or closed by swinging. This tightening band 12 is tightened together with the attachment part 1b by means of a tightening screw 13 so that the base member 1 is connected to the bicycle frame by being tightened down on the seat tube part 10 by the resulting tightening force. In this embodiment, of the pair of swinging links 2 and 3, the swinging link 2 is positioned further inward toward the bicycle frame than the swinging link 3. Furthermore, the swinging link 2 is connected in an attachment position located to the rear of the seat tube part 10, while the swinging link 3 is connected in an attachment position located to one side of the seat tube part 10. As a result, the inner and outer chain switching guides 4 and 5 are placed in the correct attachment attitude for applying an appropriate switching action to the chain 9. Of the pair of swinging links 2, 3, the outer swinging link 3 which is positioned further outward from the bicycle frame is positioned to one side of the seat tube part 10 so that the inner and outer chain switching guides 4 and 5 are supported at their front ends, on which a strong chain switching reaction force acts. As a result, the chain 9 can be switched while the inner and outer chain switching guides 4 and 5 are strongly supported against the chain switching reaction force, and the chain guides 4 and 5 may have a small size.

The inner swinging link 2 which is positioned further inward toward the bicycle frame is pivotably connected to the base member via a supporting pin 14 oriented in the longitudinal direction of the bicycle frame. The outer swinging link 3 which is positioned further outward from the bicycle frame is pivotably connected to a pair of supporting parts 1c, 1c (located at the front and back of the base member 1) by a supporting pin 15 which is positioned between the supporting parts 1c, 1c so that pin 15 is parallel or substantially parallel to the supporting pin 14.

The inner chain switching guide 4 is formed from a chain switching operating part 4a made of sheet metal which has been subjected to a hardening treatment so that operating part has a superior wear resistance and bending strength, and a sheet metal connecting part 4b which is attached to the back surface of the front end portion of the chain switching operating part 4a. This chain switching operating part 4a is equipped with a first chain pushing part 41a which is positioned at the lower end of chain switching operating part 4a, a second chain pushing part 41b which is positioned at a higher level than the first chain pushing part 41a and which projects toward the outer chain switching guide 5, and a third chain pushing part 41c which is positioned at a higher level than the second chain pushing part 41b and which projects further toward the outer chain switching guide 5.

A pair of connecting arms 4c, 4d (front and rear) formed by the connecting part 4b are pivotably mounted on the free end of the outer swinging link 3 via a pivot supporting pin 17 which is parallel or substantially parallel to the supporting pin 14. Furthermore, of the pair of connecting arms 4c, 4d, the connecting arm 4d which is located further toward the rear is pivotably mounted on the free end of the inner swinging link 2 via a pivot supporting pin 18 which is parallel or substantially parallel to the supporting pin 14. As a result, the inner chain switching guide 4 is connected to the base member 1 via the inner swinging link 2 and outer swinging link 3, and a parallel four-member link mechanism is formed by the base member 1, inner swinging link 2, outer swinging link 3 and inner chain switching guide 4. In other words, when this parallel four-member link mechanism is deformed, the inner chain switching guide 4 moves in the lateral direction of the bicycle frame with respect to the base member 1 while maintaining a fixed or substantially fixed attitude with respect to the chain wheels H1 through H3.

Figure 1:
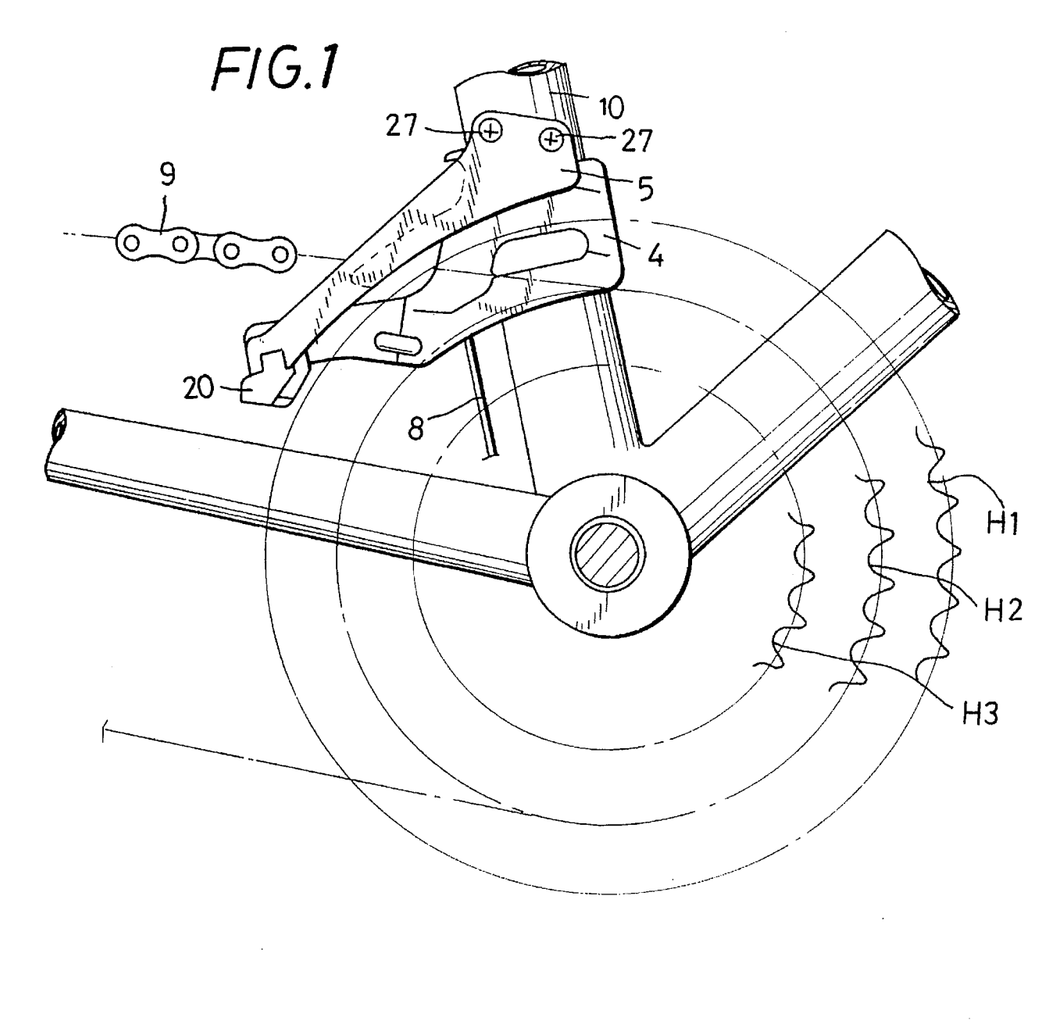
FIG. 1 is a side view of a particular embodiment of a bicycle front derailleur according to the present invention.

The outer chain switching guide 5 is formed from a chain switching operating part 5a and a connecting part 5b. Chain switching operating part 5a is made of plastic so that noise, deformation and damage can be suppressed by causing the operating part to undergo elastic deformation (thus relieving the shock caused by contact with the chain 9). Connecting part 5b is formed of iron and is fastened to the upper front end portion of the chain switching operating part 5a by means of connecting screws 27 as shown in FIG. 1. Outer chain switching guide 5 is formed as a separate pan from the inner chain switching guide 4. The chain switching operating part 5a is equipped with a first chain pushing part 51a which is positioned at the front end of chain switching operating part 5a, and a second chain pushing part 51b which is positioned at a lower level than the first chain pushing part 51a, and which projects toward the inner chain switching guide 4.

A pair of connecting parts 5c, 5d formed by the connecting part 5b are pivotably mounted via a pivot supporting pin 19 on the tip portion 3a of the outer swinging link 3. Pivot supporting pin 19 is positioned further toward the free end of link 3 than pivot pin 17, and hence further away from supporting pin 15 than supporting pin 17. Thus, the outer chain switching guide 5 is pivotably mounted on the outer swinging link 3.

The rear end portion of the chain switching operating part 5a of the outer chain switching guide 5 and the rear end portion of the chain switching operating part 4a of the inner chain switching guide 4 are connected by a swinging link 20. This swinging link 20 is pin-connected so that it can swing relative to the inner and outer chain switching guides 4 and 5. In other words, when the parallel four-member link mechanism is deformed, the outer chain switching guide 5 moves in the lateral direction of the bicycle frame with respect to the base member 1 as a result of being pivot-mounted on the outer swinging link 3, and exhibits the desired attitude for shifting (described later) with respect to the chain wheels H1 through H3 as a result of being connected to the inner chain switching guide 4 by the swinging link 20.

The connecting part 5b of the outer chain switching guide 5 is manufactured from an iron part, and it is subjected to a hardening treatment so that connecting part has a superior connecting strength and bending strength. This connecting part 5b and the chain switching operating part 5a can be separated by removing the connecting screws 27 which connect the two parts. Accordingly, in cases where the chain switching operating part 5a becomes damaged or worn, chain switching operating part 5a alone can easily be replaced. Besides being made of plastic, the chain switching operating part 5a could also be embodied using a part made of iron (which has not been heat-treated), an aluminum alloy or titanium, etc. In cases where an aluminum alloy or titanium is used for the chain switching operating part 5a, the use of iron for the inner chain switching guide 4 and connecting part 5a makes it possible to produce the derailleur inexpensively (compared to a case where an aluminum alloy or titanium is used for these parts as well). At the same time, the appearance of the chain switching operating part 5a (which is prominently visible from the side) is improved, so that the derailleur as a whole has a good appearance at a low cost.

When the operating cable 8 is slackened, the parallel four-member link mechanism is deformed as a result of the elastic recovery force of the return spring 6 so that the inner and outer swinging links 2 and 3 swing inward toward the bicycle frame with respect to the base member 1. This deformation proceeds until the mechanism reaches a deformation limit where one of a pair of stoppers 3b, 3c installed on the outer swinging link 3, I. e., the stopper 3b, contacts one of a pair of operating stroke adjustment screws 21, 22, I. e., the adjustment screw 21, attached to the connecting arm 4d. When the operating cable 8 is pulled against the force of the return spring 6, the parallel four-member link mechanism is deformed as a result of the pulling force of the operating cable 8 so that the inner and outer swinging links 2 and 3 swing outward from the bicycle frame with respect to the base member 1. This deformation proceeds until the mechanism reaches a deformation limit where the other of the pair of stoppers 3b, 3c, I. e., the stopper 3c, contacts the other of the pair of operating stroke adjustment screws 21, 22, I. e., the adjustment screw 22.

As noted above, the outer swinging link 3 operates the outer chain switching guide 5 at a pivot mounting point 19 which is located at a greater distance from the swinging fulcrum 15 than the pivot mounting point 17 of the inner chain switching guide 4. As a result of the deformation of the parallel four-member link mechanism that occurs when the operating cable 8 is slackened or pulled, the inner and outer chain switching guides 4 and 5 operate separately so that guides move through strokes of different sizes. In this embodiment, outer chain switching guide 5 moves through a larger stroke than inner chain switching guide. Accordingly, switching takes place among three positions, I. e., the low-speed position shown in FIG. 2, the medium-speed position shown in FIG. 3 and the high-speed position shown in FIG. 4, so that the chain 9 is switched among the three front chain wheels H1 through H3.

Figure 2:
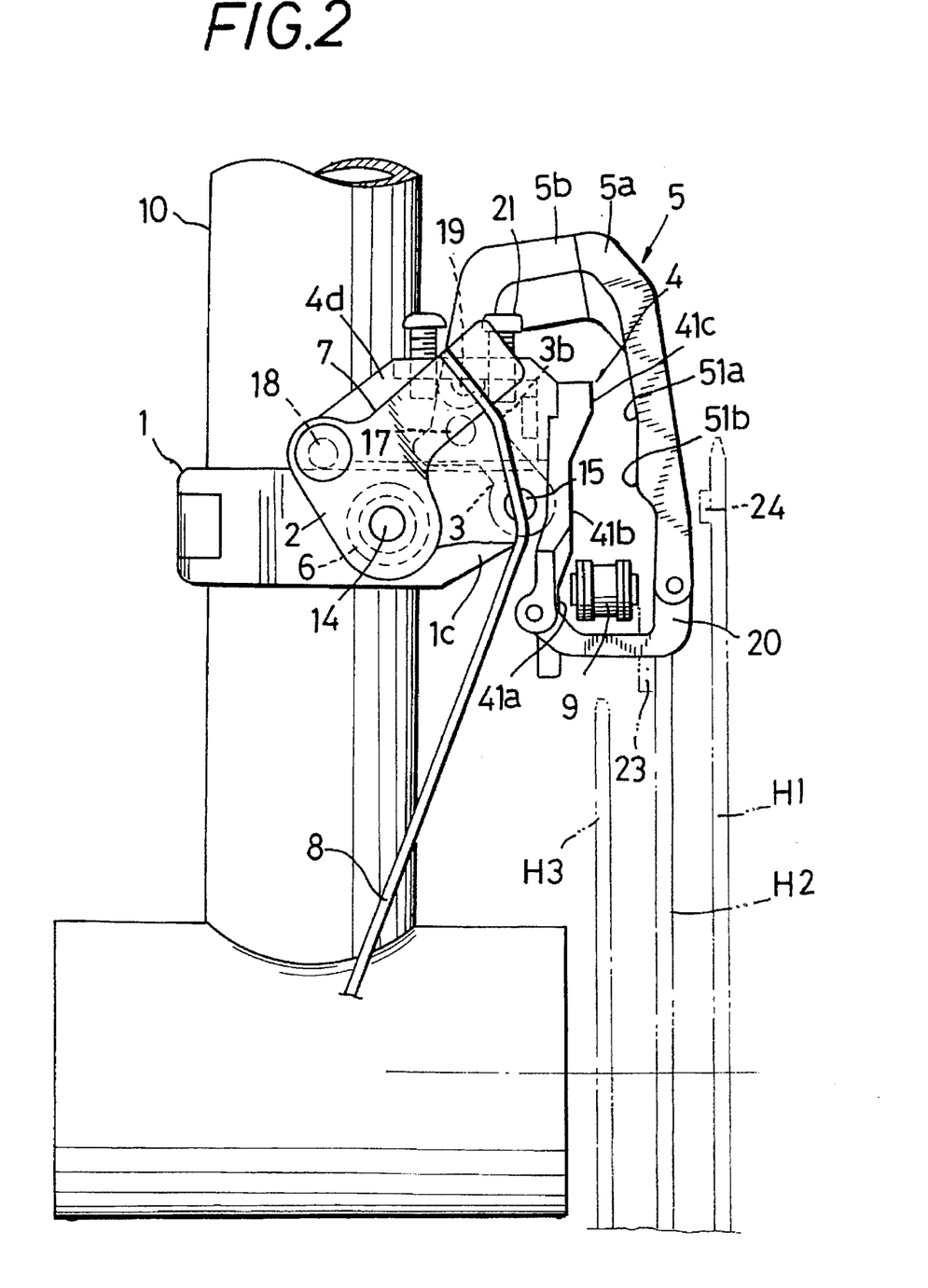
FIG. 2 is a rear view of the derailleur shown in FIG. 1 in a low-speed state.
Figure 3:
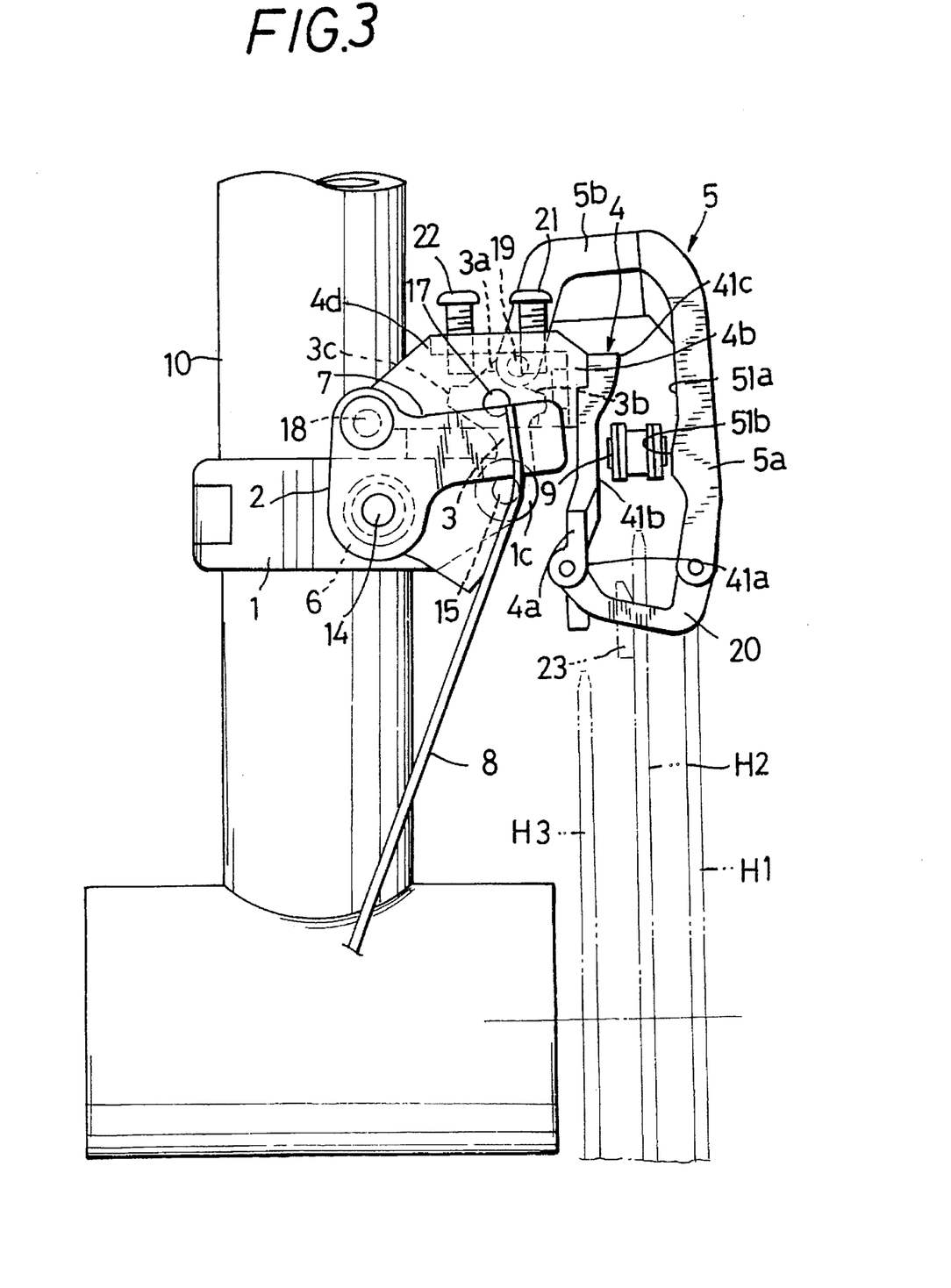
FIG. 3 is a rear view of the derailleur shown in FIG. 1 in an intermediate speed state.
Figure 6:
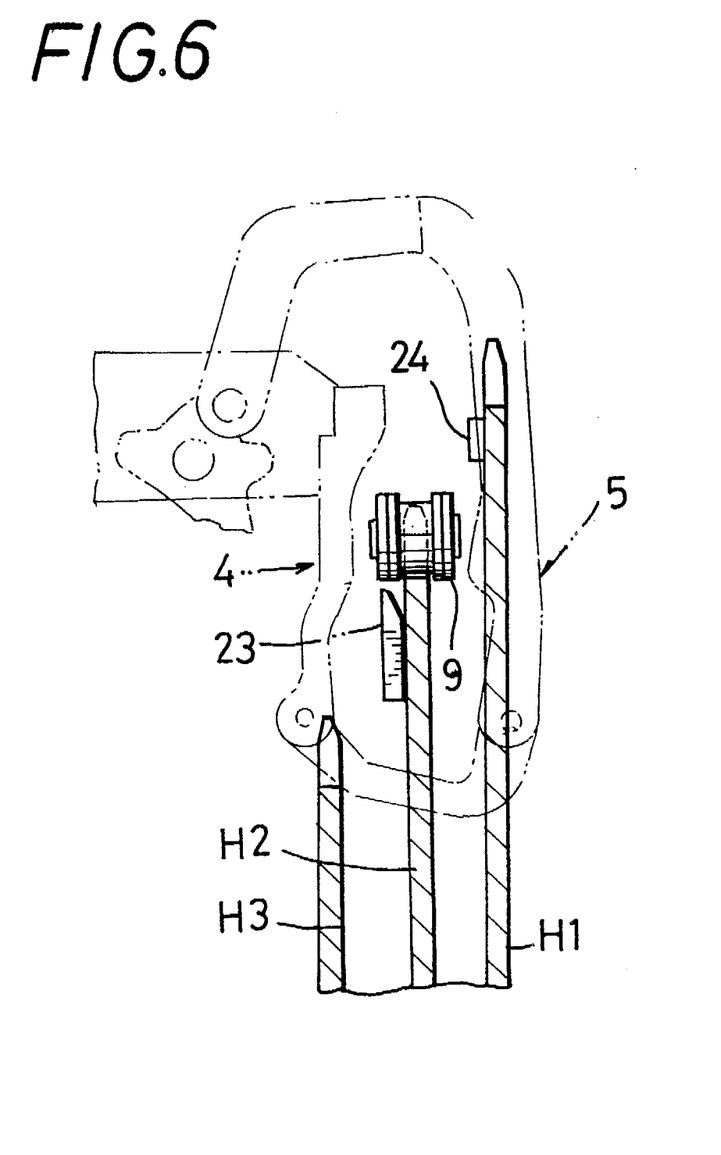
FIG. 6 is an explanatory diagram of chain switching teeth and chain receiving spikes which may be employed on chainwheels used with the front derailleur shown in FIG. 1.

More specifically, when the operating cable 8 is pulled from the low-speed state shown in FIG. 2, the inner and outer chain switching guides 4 and 5 move outward from the bicycle frame so that the system is switched to the medium-speed position shown in FIG. 3. In this case, the chain 9 is pushed toward the medium-speed chain wheel H2 from the low-speed chain wheel H3 by the first chain pushing part 41a of the chain switching operating part 4a of the inner chain switching guide 4, so that the chain 9 is caught by chain switching teeth 23 installed on the side surface of the medium-speed chain wheel facing the low-speed chain wheel as shown in FIG. 6. Accordingly, the chain 9 which has caught on the chain switching teeth 23 is drawn toward the teeth of the medium-speed chain wheel H2 as chain wheel H2 rotates, so that the chain 9 is switched from the low-speed chain wheel H3 to the medium-speed chain wheel 9. Meanwhile, the outer chain switching guide 5 moves through a slightly larger stroke than the inner chain switching guide 4, and is thus positioned to the outside of the medium-speed chain wheel H2 so that outer chain switching guide 5 does not interfere when the chain 9 catches on the medium-speed chain wheel H2.

Figure 4:
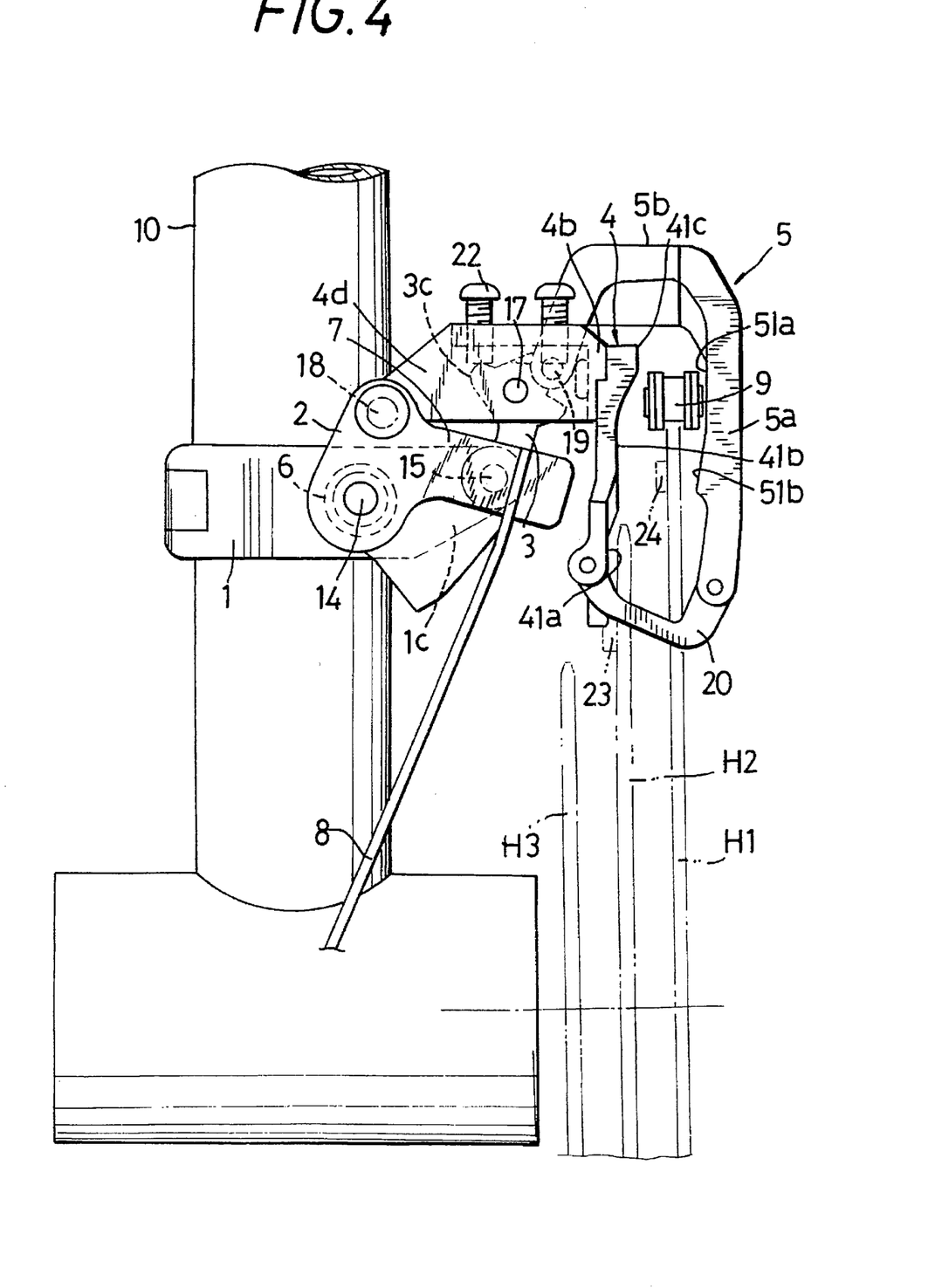
FIG. 4 is a rear view of the derailleur shown in FIG. 1 in a high-speed state.

When the operating cable 8 is pulled from the medium-speed state shown in FIG. 3, the inner and outer chain switching guides 4 and 5 move outward from the bicycle frame so that the system is switched to the high-speed position shown in FIG. 4. In this case, the chain 9 is pushed toward the high-speed chain wheel H1 from the medium-speed chain wheel H2 by the second chain pushing part 41b of the chain switching operating part 4a of the inner chain switching guide 4, so that the chain 9 is caused to ride on chain receiving spikes 24 formed on the side surface of the high-speed chain wheel H1 facing the medium-speed chain wheel as shown in FIG. 6. Accordingly, the chain 9 which has been received by the chain receiving spikes 24 is lifted to the outer circumference of the high-speed chain wheel H1 as chain wheel H1 rotates, and when the lifted chain 9 reaches the level of the third chain pushing part 41c, the chain 9 is pushed onto the teeth of the high-speed chain wheel H1 by third chain pushing part 41c, so that the chain 9 is switched from the medium-speed chain wheel H2 to the high-speed chain wheel H1. When the chain 9 engages with the teeth of the high-speed chain wheel H1, the chain 9 is caused to move slightly further toward the rotational axis of the high-speed chain wheel H1 than the position where the chain 9 was located when chain 9 was being pushed by the third chain pushing pan 41c, so that there is no interference between the chain 9 and the third chain pushing pan 41c. Meanwhile, the outer chain switching guide 5 moves through a slightly larger stroke than the inner chain switching guide 4, and is thus positioned to the outside of the high-speed chain wheel H1 so that outer chain switching guide 5 does not interfere when the chain 9 catches on the high-speed chain wheel H1.

When the operating cable 8 is slackened from the high-speed state shown in FIG. 4, the inner and outer chain switching guides 4 and 5 move inward toward the bicycle frame, so that the system is switched to the medium-speed state shown in FIG. 3. In this case, the chain 9 is pushed toward the medium-speed chain wheel H2 from the high-speed chain wheel H1 by the first chain pushing pan 51a of the chain switching operating part 5a of the outer chain switching guide 5, thus causing the chain 9 to be released from the high-speed chain wheel H1 toward the medium-speed chain wheel H2, so that the chain 9 is switched from the high-speed chain wheel H1 to the medium-speed chain wheel H2.

When the operating cable 8 is slacked from the medium-speed state shown in FIG. 3, the inner and outer chain switching guides 4 and 5 move inward toward the bicycle frame, so that the system is switched to the low-speed state shown in FIG. 2. In this case, the chain 9 is pushed toward the low-speed chain wheel H3 from the medium-speed chain wheel H2 by the second chain pushing part 51b of the chain switching operating part 5a of the outer chain switching guide 5, thus causing the chain 9 to be released from the medium-speed chain wheel H2 toward the low-speed chain wheel H3, so that the chain 9 is switched from the medium-speed chain wheel H2 to the low-speed chain wheel H3.

In the derailleur of the foregoing embodiment, the base member 1, inner swinging link 2, outer swinging link 3 and inner chain switching guide 4 form a parallel four-member link mechanism. Accordingly, inner chain switching guide 4 moves while remaining parallel to the bicycle frame. However, the positional relationship between the pivot supporting pins 17 and 19 and the positional relationship between the pivot mounting location of the swinging link 20 with respect to the inner chain switching guide 4 and the pivot mounting location of the swinging link 20 with respect to the outer chain switching guide 5 are set so that the outer chain switching guide 5 does not remain parallel to the inner chain switching guide 4 while moving.

Figure 7A:
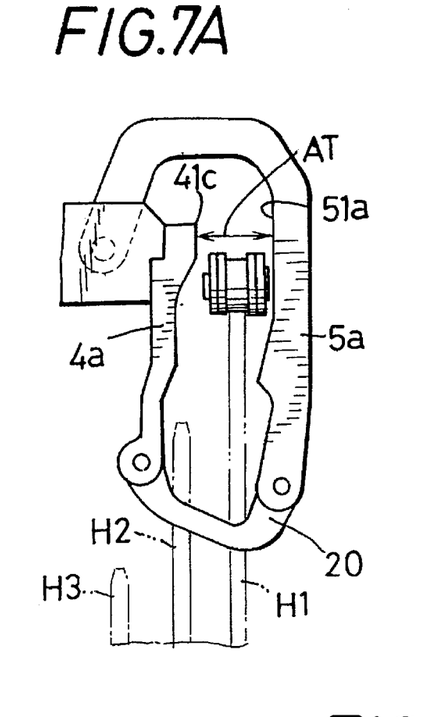
FIGS. 7A–7C are diagrams showing gaps between portions of the inner chain guide and outer chain guide of the derailleur shown in FIG. 1 when the derailleur is in various speed states.
Figure 7B:
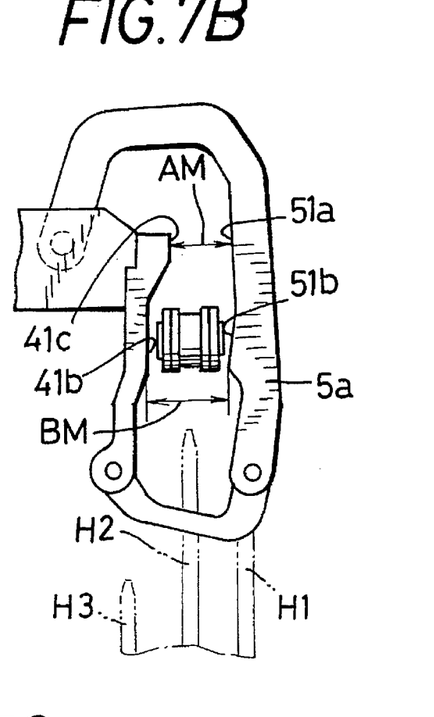
Figure 7C:
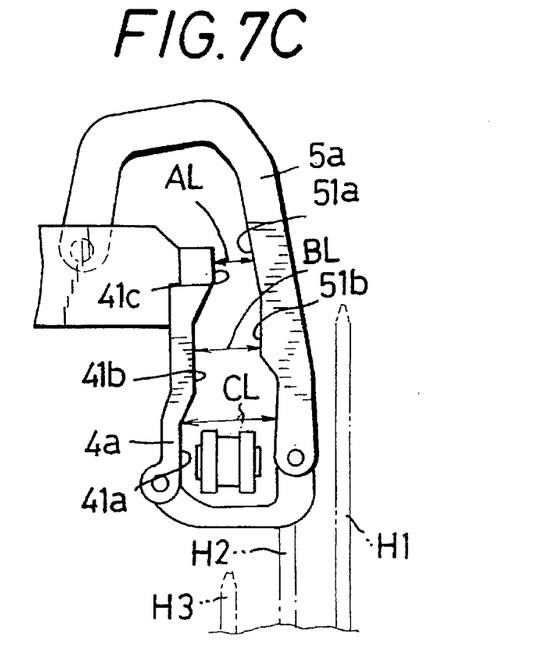

FIG. 7(a) which illustrates the high-speed state of the derailleur, FIG. 7(b) illustrates the medium-speed state of the derailleur, and FIG. 7(c) illustrates the low-speed state of the derailleur. As shown in those figures, the non-parallel movement occurs so that the gap between the chain switching operating part 5a of the outer chain switching guide 5 and the chain switching operating part 4a of the inner chain switching guide 4 widens toward the low-speed side. Here, the gap between the first chain pushing part 51a of the outer chain switching guide 5 and the third chain pushing part 41c of the inner chain switching guide 4 in the high-speed state is designated as AT, and the gap between the first chain pushing part 51a of the outer chain switching guide 5 and the third chain pushing part 41c of the inner chain switching guide 4 in the medium-speed state is designated as AM, and the gap between the first chain pushing part 51a of the outer chain switching guide 5 and the third chain pushing part 41c of the inner chain switching guide 4 in the low-speed state is designated as AL. The gap between the second chain pushing part 51b of the outer chain switching guide 5 and the second chain pushing part 41b of the inner chain switching guide 4 in the medium-speed state is designated as BM, and the gap between the second chain pushing part 51b of the outer chain switching guide 5 and the second chain pushing part 41b of the inner chain switching guide 4 in the low-speed state is designated as BL. Finally, the gap between the first chain pushing part 41a of the inner chain switching guide 4 and the chain switching operating part 5a of the outer chain switching guide 5 in the low-speed state is designated as CL. In this embodiment, the relationship of the gaps AT, AM and AL, and the relationship between the gaps BM and BL, are as follows:

gap AT>gap AM>gap AL gap BM>gap BL

Furthermore, the gap AT is set at a gap which is such that the chain does not contact the chain switching operating part 4a or the chain switching operating part 5a in the high-speed state, the gap BM is set at a gap which is such that the chain does not contact the chain switching operating part 4a or the chain switching operating part 5a in the medium-speed state, and the gap CL is set at a gap which is such that the chain does not contact the chain switching operating part 4a or the chain switching operating part 5a in the low-speed state.

Even if a construction in which the outer chain switching guide 5 moves while remaining parallel to the inner chain switching guide 4 is used, the system can be designed so that the outer chain guide 5 moves through a larger stroke than the inner chain guide 4 during shifting. However, if a construction in which the outer chain shifting guide 5 does not remain parallel to the inner chain guide 4 while moving is used, the system can be designed so that an advantageous shifting operation is possible.

Specifically, in the case of a front derailleur, it is necessary to design the derailleur so that the chain does not contact either the inner or outer chain switching guide 4 or 5 in the high-speed state, medium-speed state or low-speed state. Accordingly, even if the gap CL in the low-speed state in the case of the non-parallel movement is set so that it is the same as the gap CL in the low-speed state in the case of parallel movement, the gaps BM and AM in the medium-speed state in the case of non-parallel movement can be set so that they are smaller than the corresponding gaps in the case of parallel movement, and the gap AT in the high-speed state in the case of non-parallel movement can be set so that it is smaller than the corresponding gap in the case of parallel movement. As a result, in constructing the system so that the outer chain switching guide 5 moves through a larger stroke than the inner chain switching guide 4, the use of a means which shows the non-parallel movement instead of a means which shows the parallel movement makes it possible to reduce the operating stroke of the operating cable 8 that is required in order to operate the derailleur while maintaining the outer chain switching guide 5 in the attitude required for chain switching and for the avoidance of contact with the chain in the low-speed, medium-speed and high-speed states. In this way as well, the elastic deformation stroke of the return spring 6 can be reduced so that a comfortable shifting operation is possible.

Figure 8:
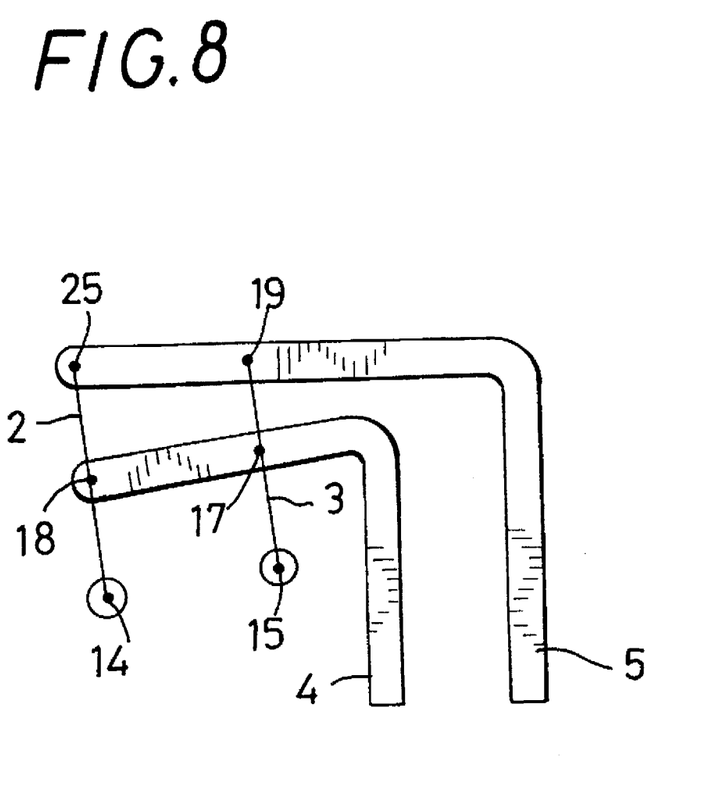
FIG. 8 is a schematic diagram of an alternative embodiment of a front derailleur according to the present invention.
Figure 9:
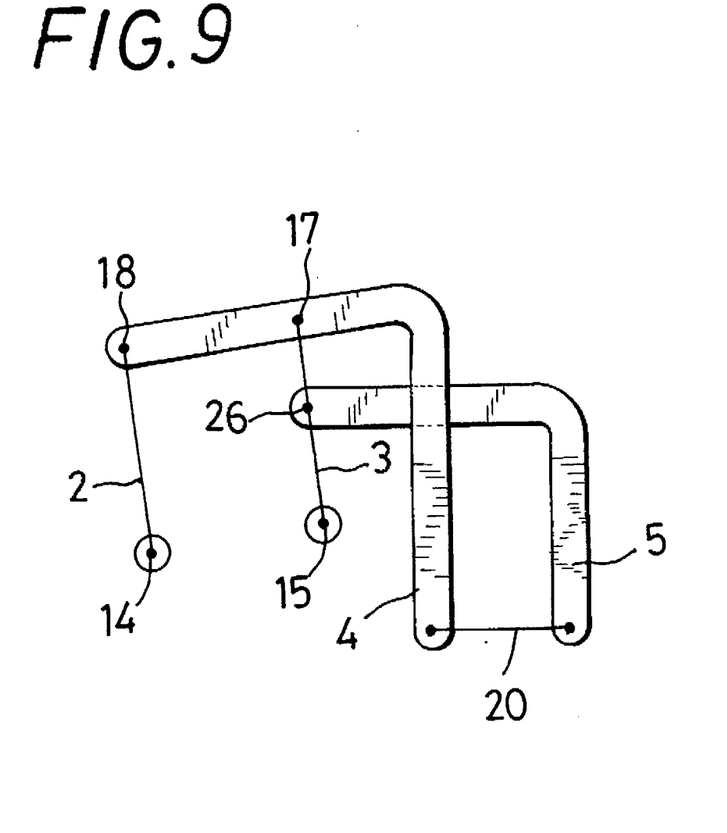
FIG. 9 is a schematic diagram of another alternative embodiment of a front derailleur according to the present invention.

FIGS. 8 and 9 are schematic diagrams of alternative embodiments of a front derailleur according to the present invention. In the embodiment shown in FIG. 8, a pivot mounting point 25 or 19 is used as the pivot mounting point of the outer chain switching guide 5, and these pivot mounting points 25 or 19 are located at a greater distance from the swinging fulcrum 14 or 15 than the pivot mounting point 18 or 17 used to connect the inner chain switching guide 4. This embodiment is constructed so that the outer chain switching guide 5 is pivotably mounted on either the inner or outer swinging link 2 or 3 (or both), and so that the outer chain switching guide 5 moves through a larger stroke than the inner chain switching guide 4.

FIG. 9 shows an embodiment of the derailleur which is constructed so that the inner and outer chain switching guides 4 and 5 operate separately in such a manner that the operating stroke of the outer chain switching guide 5 is smaller than the operating stroke of the inner chain switching guide 4. More specifically, in this embodiment, a point on the outer swinging link 3 which is located at a smaller distance from the swinging fulcrum 15 than the pivot mounting point 17 at which the inner chain switching guide 4 is pivot-mounted is set as the pivot mounting point of the outer chain switching guide. In this embodiment, the chain switching operating part of the outer chain switching guide 5 may be equipped with chain pushing parts having different projecting heights, the chain switching operating part of the inner chain switching guide 4 may be formed with a flat surface, and the derailleur may be used with front chain wheels which do not have the chain switching teeth or chain receiving spikes.

In short, the present invention can be used either in a front derailleur which is constructed so that the outer chain switching guide 5 moves through a larger stroke than the inner chain switching guide 4, or in a front derailleur which is conversely constructed so that the outer chain switching guide 5 moves through a smaller stroke than the inner chain switching guide 4.

In cases where the outer chain switching guide 5 is connected to both the inner and outer swinging links 2,3, the inner and outer chain switching guides 4,5 operate separately as a result of having different pivot mounting points. In such cases, the outer chain switching guide 5 maintains the prescribed attitude required for chain switching as a result of being supported by both the inner and outer swinging links 2,3. However, connecting parts must be provided in order to connect the outer chain switching guide 5 to both the inner and outer swinging links 2,3. On the other hand, if the outer chain switching guide 5 is connected to the outer swinging link 3, and is connected to the inner chain switching guide 4 by means of swinging link 20, the outer chain switching guide 5 will operate separately from the inner chain switching guide 4 as a result of the operation of the outer swinging link 3. Furthermore, the outer chain switching guide 5 will maintain the prescribed attitude required for chain switching as a result of being supported by the inner chain switching guide 4 via the swinging link 20. Accordingly, there is no need to provide a construction for connecting the outer chain switching guide 5 to the inner swinging link 2. The swinging link 20 which connects the two chain switching guides 4,5 can be formed more compactly than a construction which is used to connect the outer chain switching guide 5 to the inner swinging link 2. In addition to the other benefits noted above, swinging link 20 prevents the chain from completely derailing from the chainwheels. Furthermore, if swinging link 20 were not provided, then the chain switching guides 4,5 would have to be made from a thicker and/or stronger material to be strong enough to withstand the forces provided by the chain. In other words, the use of swinging link 20 also allows chain switching guides 4,5 to be made economically using thin and relatively soft material.

While the above is a description of various embodiments of the present invention, further modifications may be employed without departing from the spirit and scope of the present invention. For example, In the first embodiment described above, front chain wheels equipped with chain switching teeth 23 or chain receiving spikes 24 were used as the chain wheels that were the objects of chain switching. However, it would also be possible to use the derailleur of the present invention with front chain wheels which lack such chain switching teeth or chain receiving spikes, and which are designed so that up-shifting is accomplished by pressing the chain against the side surfaces of the wheels by means of the inner chain switching guide of the derailleur. Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A front derailleur for a bicycle comprising:
a base member (1) for connecting to a bicycle frame (10);
a first link (3) pivotably connected to the base member (1) at a first base member connection location (15);
a second link (2) pivotably connected to the base member (1) at a second base member connection location (14);
an inner chain guide (4) pivotably connected to the first link (3) at a first inner chain guide connection location (17) and to the second link (2) at a second inner chain guide connection location (18) so that the inner chain guide (4) moves laterally when the first link (3) and the second link (2) pivot relative to the base member (1); and
an outer chain guide (5) pivotably connected to at least one of the first link (3) or the second link (2) at a first outer chain guide connection location (19,26) which differs from the corresponding first inner chain guide connection location (17) or second inner chain guide connection location (18) and which differs from the corresponding first base member connection location (15) or second base member connection location (14) so that the outer chain guide (5) moves laterally relative to the inner chain guide (4) when the first link (3) and the second link (2) pivot relative to the base member (1).

2. A front derailleur for a bicycle comprising:
a base member (1) for connecting to a bicycle frame (10);
a first link (3) pivotably connected to the base member (1) at a first base member connection location (15);
a second link (2) pivotably connected to the base member (1) at a second base member connection location (14);
an inner chain guide (4) pivotably connected to the first link (3) at a first inner chain guide connection location (17) and to the second link (2) at a second inner chain guide connection location (18) so that the inner chain guide (4) moves laterally when the first link (3) and the second link (2) pivot relative to the base member (1);
an outer chain guide (5) pivotably connected to at least one of the first link (3) or the second link (2) at a first outer chain guide connection location (19,26) which differs from the corresponding first inner chain guide connection location (17) or second inner chain guide connection location (18) so that the outer chain guide (5) moves laterally when the first link (3) and the second link (2) pivot relative to the base member (1); and
wherein a distance between the first outer chain guide connection location (19) and the corresponding first base member connection location (15) or second base member connection location (14) is greater than a distance between the corresponding first inner chain guide connection location (17) or second inner chain guide connection location (18) and the first base member connection location (15) or second base member connection location (14).

3. The front derailleur according to claim 2 wherein the outer chain guide (5) is connected to the first link (3) so that the distance between the first outer chain guide connection location (19) and the first base member connection location (15) is greater than the distance between the first inner chain guide connection location (17) and the first base member connection location (15).

4. The front derailleur according to claim 1 further comprising a swinging link (20) pivotably connected to the inner chain guide (4) and to the outer chain guide (5).

5. The front derailleur according to claim 1 wherein the base member (1) is adapted to be mounted to a seat tube of the bicycle, wherein the first link (3) is connected to the base member (1) so that the first link (3) is disposed at a lateral side of the seat tube when the base member (1) is mounted to the seat tube, and wherein the second link (2) is connected to the base member (1) so that the second link (2) is disposed to the rear of the seat tube when the base member is mounted to the seat tube.

6. The front derailleur according to claim 1 wherein the first link (3) is mounted to a lateral side portion of the base member (1), and wherein the second link (2) is mounted to a rear portion of the base member (1).

7. The front derailleur according to claim 1 wherein the outer chain guide (5) includes a side portion (5a) formed of a plastic material.

8. The front derailleur according to claim 1 wherein a distance between the first outer chain guide connection location (26) and the corresponding first base member connection location (15) or second base member connection location (14) is less than a distance between the corresponding first inner chain guide connection location (17) or second inner chain guide connection location (18) and the first base member connection location (15) or second base member connection location (14).

9. The front derailleur according to claim 8 wherein the outer chain guide (5) is connected to the first link (3) so that the distance between the first outer chain guide connection location (26) and the first base member connection location (15) is less than the distance between the first inner chain guide connection location (17) and the first base member connection location (15).

10. A front derailleur for a bicycle comprising:
a base member (1) for connecting to a bicycle frame (10);
a first link (3) pivotably connected to the base member (1) at a first base member connection location (15);
a second link (2) pivotably connected to the base member (1) at a second base member connection location (14);
an inner chain guide (4) pivotably connected to the first link (3) at a first inner chain guide connection location (17) and to the second link (2) at a second inner chain guide connection location (18) so that the inner chain guide (4) moves laterally when the first link (3) and the second link (2) pivot relative to the base member (1);
an outer chain guide (5) pivotably connected to at least one of the first link (3) or the second link (2) at a first outer chain guide connection location (19,26) which differs from the corresponding first inner chain guide connection location (17) or second inner chain guide connection location (18) so that the outer chain guide (5) moves laterally when the first link (3) and the second link (2) pivot relative to the base member (1); and
wherein the outer chain guide (5) is pivotably connected to the first link (3) at a first outer chain guide connection location (19) and to the second link (2) at a second outer chain guide connection location (25) which differs from the corresponding first inner chain guide connection location (17) and second inner chain guide connection location (18) so that the outer chain guide (5) moves laterally when the first link (3) and the second link (2) pivot relative to the base member (1).

11. The front derailleur according to claim 10 wherein the distance between the first outer chain guide connection location (19) and the first base member connection location (15) is greater than the distance between the first inner chain guide connection location (17) and the first base member connection location (15), and wherein the distance between the second outer chain guide connection location (25) and the second base member connection location (14) is greater than the distance between the second inner chain guide connection location (18) and the second base member connection location (14).

12. The front derailleur according to claim 1 wherein the inner chain guide (4) includes:
a first inner chain pushing part (41a) which is positioned at a lower end of the inner chain guide;
a second inner chain pushing part (41b) which is positioned at a higher level than the first inner chain pushing part (41a) and which projects toward the outer chain guide (5); and
a third inner chain pushing part (41c) which is positioned at a higher level than the second inner chain pushing part (41b) and which projects further toward the outer chain guide (5) than the second inner chain pushing part.

13. The front derailleur according to claim 1 wherein the outer chain guide (5) includes:
a first outer chain pushing part (51a) which is positioned at a front end of the outer chain guide (5); and
a second outer chain pushing part (51b) which is positioned at a lower level than the first inner chain pushing part (51a) and which projects toward the inner chain guide (4).

14. The front derailleur according to claim 1:
wherein the inner chain guide (4) includes:
a first inner chain pushing part (41a) which is positioned at a lower end of the inner chain guide;
a second inner chain pushing part (41b) which is positioned at a higher level than the first inner chain pushing part (41a) and which projects toward the outer chain guide (5); and
a third inner chain pushing part (41c) which is positioned at a higher level than the second inner chain pushing part (41b) and which projects further toward the outer chain guide (5) than the second inner chain pushing part; and
wherein the outer chain guide (5) includes:
a first outer chain pushing part (51a) which is positioned at a front end of the outer chain guide (5); and
a second outer chain pushing part (51b) which is positioned at a lower level than the first inner chain pushing part (51a) and which projects toward the inner chain guide (4).

15. A front derailleur for a bicycle comprising:
a base member (1) for connecting to a bicycle frame (10);
a first link (3) pivotably connected to the base member (1) at a first base member connection location (15);
a second link (2) pivotably connected to the base member (1) at a second base member connection location (14);
an inner chain guide (4) pivotably connected to the first link (3) at a first inner chain guide connection location (17) and to the second link (2) at a second inner chain guide connection location (18) so that the inner chain guide (4) moves laterally when the first link (3) and the second link (2) pivot relative to the base member (1);
an outer chain guide (5) pivotably connected to at least one of the first link (3) or the second link (2) at a first outer chain guide connection location (19,26) which differs from the corresponding first inner chain guide connection location (17) or second inner chain guide connection location (18) so that the outer chain guide (5) moves laterally when the first link (3) and the second link (2) pivot relative to the base member (1);

wherein the inner chain guide (4) includes:
- a first inner chain pushing part (41a) which is positioned at a lower end of the inner chain guide;
- a second inner chain pushing part (41b) which is positioned at a higher level than the first inner chain pushing part (41a) and which projects toward the outer chain guide (5); and
- a third inner chain pushing part (41c) which is positioned at a higher level than the second inner chain pushing part (41b) and which projects further toward the outer chain guide (5) than the second inner chain pushing part; and wherein the outer chain guide (5) includes:
- a first outer chain pushing part (51a) which is positioned at a front end of the outer chain guide (5); and
- a second outer chain pushing part (51b) which is positioned at a lower level than the first inner chain pushing part (51a) and which projects toward the inner chain guide (4); and wherein a distance (AT) between the first outer chain pushing part (51a) and the third inner chain pushing part (41c) when the first link (3) and the second link (2) are located at a first position is greater than a distance (AM) between the first outer chain pushing part (51a) and the third inner chain pushing part (41c) when the first link (3) and the second link (2) are located at a second position that is laterally inward of the first position.

16. The front derailleur according to claim 14 wherein a distance (BM) between the second outer chain pushing part (51b) and the second inner chain pushing part (41b) when the first link (3) and the second link (2) are located at a first position is greater than a distance (BL) between the second outer chain pushing part (51b) and the second inner chain pushing part (41b) when the first link (3) and the second link (2) are located at a second position that is laterally inward of the first position.

17. The front derailleur according to claim 14 wherein a distance (AT) between the first outer chain pushing part (51a) and the third inner chain pushing part (41c) when the first link (3) and the second link (2) are located at a first position is greater than a distance (AM) between the first outer chain pushing part (51a) and the third inner chain pushing part (41c) when the first link (3) and the second link (2) are located at a second position, wherein a distance (BM) between the second outer chain pushing part (51b) and the second inner chain pushing part (41b) when the first link (3) and the second link (2) are located at the first position is greater than a distance (BL) between the second outer chain pushing part (51b) and the second inner chain pushing part (41b) when the first link (3) and the second link (2) are located at the second position, and wherein the second position is laterally inward of the first position.

* * * * *